United States Patent
Wendt et al.

(10) Patent No.: US 7,341,138 B1
(45) Date of Patent: Mar. 11, 2008

(54) CONVEYOR IDLE ROLLER ASSEMBLY

(76) Inventors: Darryl R. Wendt, 5970 Morning Dr., Davisburg, MI (US) 48350; Lawrence E. Cislo, 2713 Hartun, Brighton, MI (US) 48114

(*) Notice: Subject to any disclaimer, the term of this patent is extended or adjusted under 35 U.S.C. 154(b) by 0 days.

(21) Appl. No.: 11/619,763

(22) Filed: Jan. 4, 2007

(51) Int. Cl.
    *B65G 13/00* (2006.01)
(52) U.S. Cl. .................. 193/35 R; 193/37; 198/780
(58) Field of Classification Search ............ 198/780; 193/35 R, 37; 384/480, 546
    See application file for complete search history.

(56) References Cited

U.S. PATENT DOCUMENTS

| | | | |
|---|---|---|---|
| 3,621,985 A | 11/1971 | Pelzer | |
| 3,757,930 A | 9/1973 | Kramer | |
| 3,786,549 A * | 1/1974 | Pott | 198/843 |
| 3,847,260 A | 11/1974 | Fowler | |
| 4,029,200 A | 6/1977 | Dillon | |
| 4,181,217 A | 1/1980 | Huls et al. | |
| 4,204,594 A * | 5/1980 | Banno | 198/827 |
| 4,267,920 A | 5/1981 | Olschewski et al. | |
| 4,344,218 A * | 8/1982 | Hooper et al. | 29/516 |
| 4,573,563 A | 3/1986 | Delhaes | |
| 4,606,659 A | 8/1986 | Hogan | |
| 4,955,462 A * | 9/1990 | Bilodeau et al. | 193/37 |
| 5,022,132 A | 6/1991 | Valster et al. | |
| 5,205,398 A * | 4/1993 | Hart et al. | 198/780 |
| 5,261,528 A | 11/1993 | Bouchal | |
| 5,372,230 A | 12/1994 | Niklewski | |
| 5,383,549 A * | 1/1995 | Mayer | 198/842 |
| 5,454,460 A | 10/1995 | Lane | |
| 5,472,080 A | 12/1995 | Fukuoka | |
| 5,642,800 A | 7/1997 | East | |
| 5,655,642 A | 8/1997 | Lawrence et al. | |
| 5,722,888 A | 3/1998 | Lane | |
| 6,053,298 A * | 4/2000 | Nimmo et al. | 193/37 |
| 6,098,776 A | 8/2000 | Schiering | |
| 6,135,159 A | 10/2000 | Karl | |
| 6,234,293 B1 | 5/2001 | Fasoli | |
| 6,287,014 B1 | 9/2001 | Salla | |
| 6,641,512 B2 * | 11/2003 | Bryant et al. | 492/16 |
| 6,814,213 B2 * | 11/2004 | Dyson et al. | 193/37 |
| 6,899,517 B2 * | 5/2005 | Gay et al. | 415/104 |
| 7,040,482 B2 * | 5/2006 | Loth | 198/782 |

OTHER PUBLICATIONS

Product Literature from YeloRoll Global Website, Mar. 2007.

* cited by examiner

*Primary Examiner*—Douglas A Hess
(74) *Attorney, Agent, or Firm*—Brooks Kushman P.C.

(57) ABSTRACT

Idle roller assembly suitable for use in trough type belt conveyors is provided having an elongate shaft and spaced apart first and second roller bearing assemblies, each having mounted thereabout an annular hub. A cylindrical tubular roller is mounted to and spans between the spaced apart hubs forming a conveyor support surface. One of the roller bearings affixed to the shaft in a fixed axial position while the other bearing outer race is capable of moving axially sufficiently to accommodate thermal expansion of the cylindrical tubular roller during use. Seals are provided, outboard of each of the hub members between the hub and the adjacent shaft to isolate the bearings from the environment.

16 Claims, 4 Drawing Sheets

US 7,341,138 B1

CONVEYOR IDLE ROLLER ASSEMBLY

BACKGROUND OF THE INVENTION

1. Field of the Invention

The present invention relates generally to conveyor belt support rollers and particularly, roller assemblies capable for use with contoured or trough type conveyor belts supported by an array of elongate rollers generally forming a convex trough.

2. Background Art

Trough type conveyors are commonly used to transport loose bulk material such as coal, ore, grain or other granular bulk materials. Typically, a relatively wide flexible belt is supported by a series of axially spaced apart roller sets which are arranged to form an elongate concave trough. The belt forms an elongate loop with the ends of the loop entrained about pulleys at least one of which is mechanically driven. Typically, the conveyor belt return flight is oriented below the generally concave shaped conveyor flight which transports the bulk cargo. A prior art trough type conveyor is generally shown in U.S. Pat. No. 4,029,200.

When trough type conveyors are used to transport abrasive materials such as sand, gravel, ore, or cement, roller wear is a problem. Both wear of the roller peripheral surface which comes into contact with the conveyor belt as well as wear on the bearings utilized to pivotally support the rollers upon the conveyor frame is a maintenance problem.

SUMMARY OF THE INVENTION

The present invention provides a support roller for a trough conveyor belt which has a long life relative to its manufacturing costs.

In one embodiment of the invention, an idle roller is provided having an elongated axial shaft, a pair of spaced apart bearings, each bearing having an annular hub member formed in situ thereabouts permanently bonded to the outer bearing race. A cylindrical tubular roller is mounted to and spans between the spaced apart annular hub members. Preferably, seals are provided outboard of the first and second roller bearings, each having a stationary portion affixed to the shaft adjacent to and outboard of the bearing and a rotary portion affixed to the annular hub member, to seal the bearings from external dirt and debris.

Preferably, at least one of the two bearings is mounted to the elongate axial shaft in a manner such that the two spaced apart annular hub members can move axially relative to one another to accommodate thermal expansion of the tubular roller during use. Limited axial movement can be achieved by the use of a cylindrical roller bearing or by allowing the inner bearing race of a ball type bearing to axially move relative to the axial shaft. Axial movement can be accommodated by use of a cylindrical roller bearing or by allowing the inner bearing race to axially move relative to the axial shaft.

In an alternative embodiment, the idle roller assembly is made up of an elongate axial shaft having spaced apart opposed ends and a pair of first and second roller bearing assemblies mounted upon the axial shaft inboard of each of the opposed ends. Each of the first and second bearings has an inner race cooperating with the axial shaft and an outer race pivotally supported concentrically thereabout upon a plurality of roller elements. A first and second annular hub member is orientated about and affixed to the outer race of each of the first and second bearing assemblies. A cylindrical tubular roller formed of a high density polymeric material is mounted to and spans between the outer periphery of the spaced apart annular hub members. A pair of seals are provided outboard of the first and second roller bearings, each of the seals having a stationary member affixed to the axial shaft and rotating member mounted in the bearing hub. In order to accommodate thermal expansion of the cylindrical tubular roller, one of the roller bearings is mounted at a fixed axial position on the elongate axial shaft while the inner race of the other roller bearing is capable of limited axial movement relative to the axial shaft in order to accommodate axial movement of the annular hub members as the cylindrical tubular roller varies in length.

DETAILED DESCRIPTION OF THE PREFERRED EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figures 1, 2:
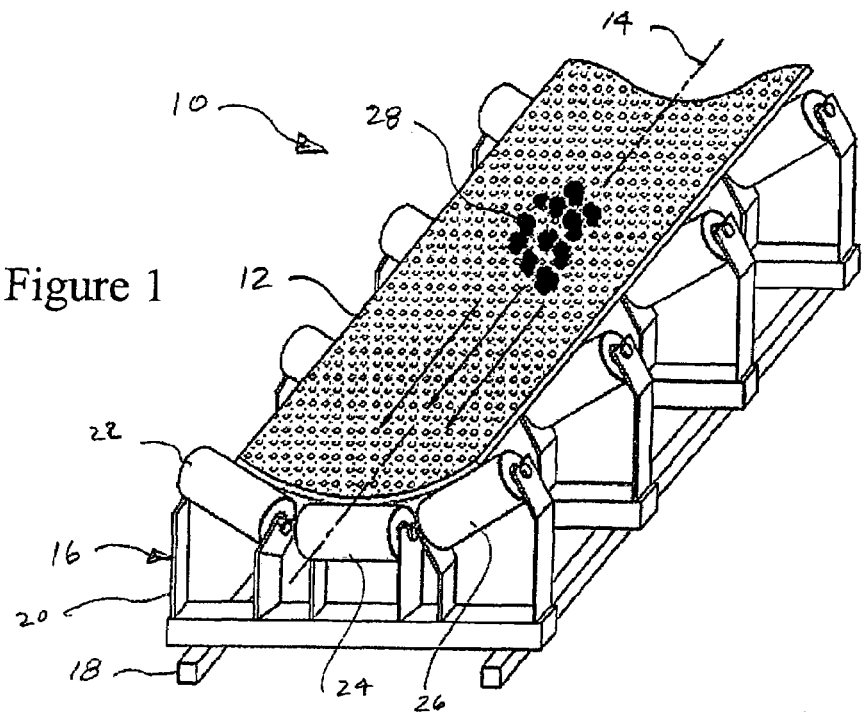
FIG. 1 is a perspective view of a trough type conveyor carrying bulk cargo.
FIG. 2 is a cross-sectional side view of an embodiment of the present invention.

FIG. 1 illustrates a trough conveyor assembly 10 having a relatively wide flexible belt 12 which moves along axis 14 in the direction of the arrow indicated. Belt 12 is preferably formed of a rubber-like material and provided with internal fiber reinforcements as is conventional in the industry. Belt 12 is supported upon a series of roller sets 16 which are axially spaced along conveyor frame 18. Roller set 16 preferably includes a sub frame 20 and a plurality of rollers 22, 24 and 26, which are pivotally mounted to the sub frame and are free to rotate. The upper surface of the roller 22, 24, and 26, collectively define a concave support surface for cooperating with the underside of belt 12 to form a generally concave moving conveyor supporting bulk cargo 28. There may be as few as two and as many as a dozen or more rollers forming a roller set defining a concave trough to support a moving belt. Bulk cargo 28 can be any common loose material suitable for transport in a moving conveyor such as ore, grain, waste sludge or the like. The invention is not intended to be limited to the particular bulk cargo transported on the trough conveyor or any particular number of rollers or conveyor length. However, the invention is particularly well suited for bulk cargo which includes fine, abrasive particles which commonly result in rapid wear of the roller assemblies.

A cutaway side elevation of a first embodiment illustrate an idle roller assembly 30 of the present invention is shown in FIG. 2. Idle roller assembly 30 is made up of an elongate axial shaft 32 having spaced apart ends. The ends of axial shaft 32 are adapted to be mounted to the conveyor frame 18, either directly or via removable cassette or a sub frame 20 as illustrated in FIG. 1. Preferably, the elongate axial shaft is attached to the conveyor frame in a manner such that shaft 32 does not rotate during normal operation of the conveyor. A pair of bearings, first roller bearing 34 and second roller bearing 36, are mounted on shaft 32 inboard of each of the shaft ends as illustrated. Each of the roller bearings, 34 and 36, are provided with an inner race mounted about the elongate shaft 32, an outer race surrounding the inner race, and a plurality of roller elements oriented there between and spaced about the shaft axis enabling the outer race to freely rotate concentrically about the inner race. First bearing 34 in the FIG. 2 embodiment has a ball type bearing roller which is best seen in an enlarged FIG. 3. Ball bearing 34 is provided with an inner race 38, an outer race 40 and a series of ball bearings 42 spaced about the axis of shaft 32 in a conventional manner. Inner race 38 is held in a fixed axial position in shaft 32. In the embodiment illustrated, one axial end of the inner race abuts the shoulder 43 machined on shaft 32, while the other side of the inner race is held in place by a snap ring 44 mounted in groove 46 in axial 32. Of course, various other techniques can be utilized to axial constrain inner race 38, including, but not limited to using a pair of snap rings or a tubular retaining sleeve.

Figure 3:
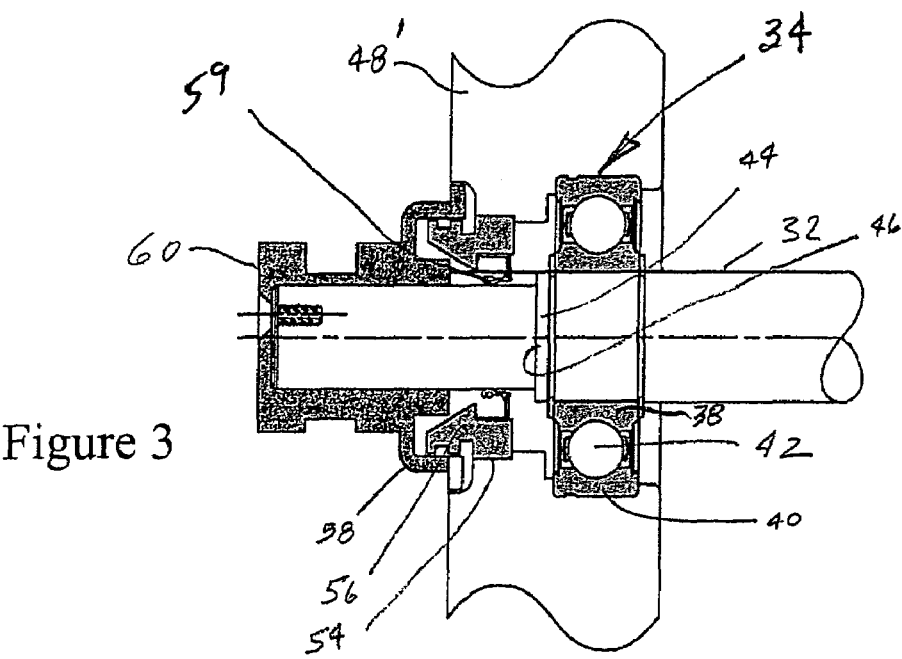
FIG. 3 is an enlarged cross-sectional cutaway view of a first roller bearing assembly.

The outer race 40 of first bearing assembly 34 is mounted within a first annular hub member 48 shown in FIGS. 2 and 3. Hub member can be formed separately and attached to the bearing outer race 38 or in the case of hub member 48 illustrated in this embodiment, the hub member may be formed in situ about the outer race bearing 40. Preferably, the bearing outer race will have a series of irregularities on the outer peripheral surface such as flats or a knurled region to help mechanically attach the outer bearing race to the annular hub member and prevent relative rotation or axial movement. The annular hub member 48 may be formed in situ by a plastic injection molding of a thermal plastic material such as a fiber reinforced structural plastic such as glass filled nylon, acetel or ABS. Alternatively, annular hub member 48 may be formed in situ about bearing outer race 40 using a low pressure injection molding of a reaction injection moldable material (RIM) such as glass fiber reinforced polyurethane. A representative and non-limiting example of a RIM material is illustration in U.S. Pat. No. 6,242,555 incorporated by reference for general background purposes. Additionally, the outer bearing race may be bonded to the hub using an epoxy or other suitable adhesive.

Annular hub member 48 forms a donut-like structure extending about the outer periphery of the outer bearing race 40. The outer annular surface of annular hub member 48 is generally cylindrical and has an axial length sufficient to cooperate with and support one end of a cylindrical, tubular roller 50 mounted thereabout. Tubular roller 50 preferably has a tubular bore having stepped counter bores 52 at each end as illustrated in FIG. 2, sized to receive annular hub member 48. Preferably, cylindrical, tubular roller 50 is formed of a high density polymeric material, such as nylon fiber filled polypropylene or the like. Other high density polymeric materials such as high density polyethylene (HDPE) can be used, as can non-polymeric materials such as steel, aluminum and various ceramics or various laminated combinations thereof. In the embodiment illustrated, polypropylene was chosen because of its cost, its wear characteristics and its suitability for the particular conveyor application contemplated.

The annular hub member 48 is further provided with an internal inner counter bore 54 located outboard of first bearing 34 as illustrated in FIG. 3. Inner counter bore 54 is sized to receive a rotary seal element 56. A stationary seal element 58 cooperates with the rotary seal element to form a labyrinth seal. Stationary seal element 58 is fixed relative to shaft 32. A lip seal 59 attached to rotary seal 56 rides on shaft 32. In the embodiment illustrated in FIG. 3, fixed seal element 58 is mounted on the exterior of end cap 60 secured to the distal end of shaft 32 as illustrated. End cap 60 can be provided with a series of ribbed and/or notches in order to affix the shaft 32 with the conveyor frame in a non-rotating manner. In the embodiment illustrated, elastomeric seal 5960 is additionally provided to seal the axial passageway between the outer periphery of shaft 32 and the counterbore 54 of annular hub 48.

Rotary seal element 56 contains a series of grooves forming a labyrinth. Stationary seal element 58 has a drainage hold or slot at low point (not shown).

Figure 4:
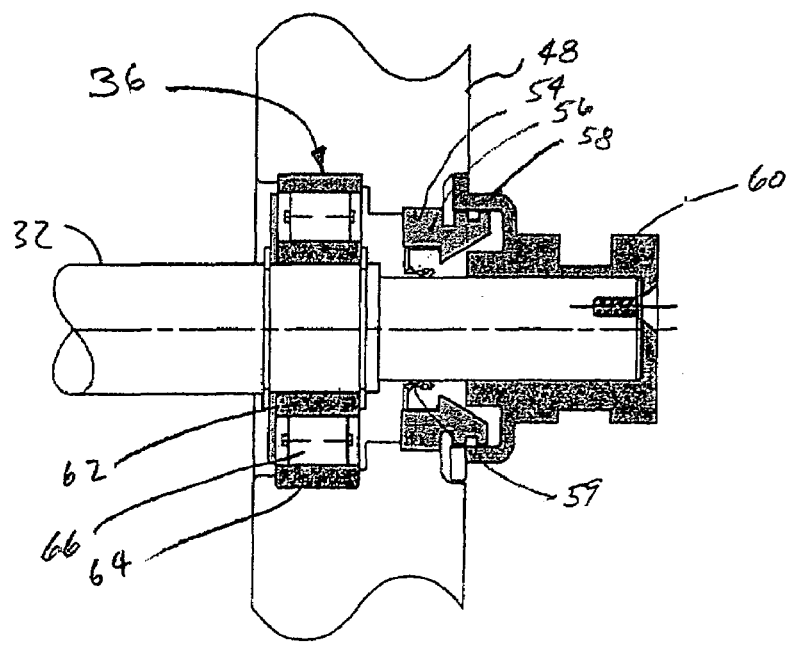
FIG. 4 is a cross-sectional side view of a second roller bearing assembly.

FIG. 4 illustrates an enlarged view of second roller bearing assembly 36. In the embodiment illustrated, second roller bearing 36 is made up of an inner race 62, an outer race 64 and a series of cylindrical rollers 66 positioned about the central axis of shaft 32. By using cylindrical roller 66, the outer bearing race 64 is free to move axially within a limited range relative to inner bearing race 64. This freedom of movement accommodates for variations of length of cylindrical roller 50 caused by the greater coefficient thermal expansion of tubular roller 50 relative to the steel axial shaft 32. Except for the use of the cylindrical bearing, the structure of the annular hub labyrinth seal and end cap are similar to and simply a mirror image of the corresponding structure shown and described with reference to FIG. 3. Cylindrical tubular roller 50 spans between annular hubs 48 and 48' illustrated in FIG. 2 to provide a rolling support surface for conveyor belt 12.

Figure 5:
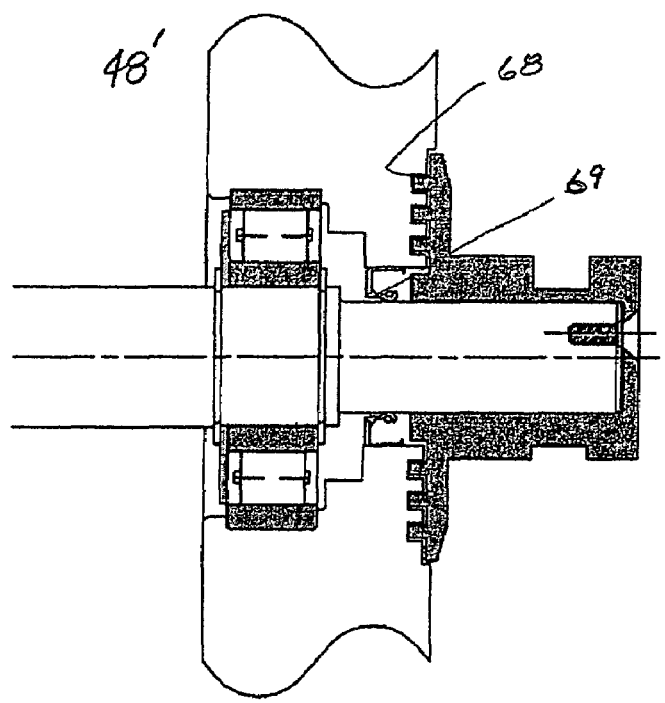
FIG. 5 is a cross-sectional side view depicting an alternative seal member.

It should be appreciated that various seal arrangements can be utilized in practicing the present invention. FIG. 5 illustrates an alternative embodiment of the invention using a radial labyrinth seal 68 which can have a rotary seal element 69 which presses into annular hub 48' in a manner similar to the embodiment illustrated in FIGS. 3 and 4 or the rotary labyrinth may be integrally formed as part of the annular hub member 48. In either event, a stationary seal element is mounted adjacent thereto and affixed relative to shaft 32 to inhibit dirt and debris from coming in contact with the roller bearing assembly.

Figure 6:
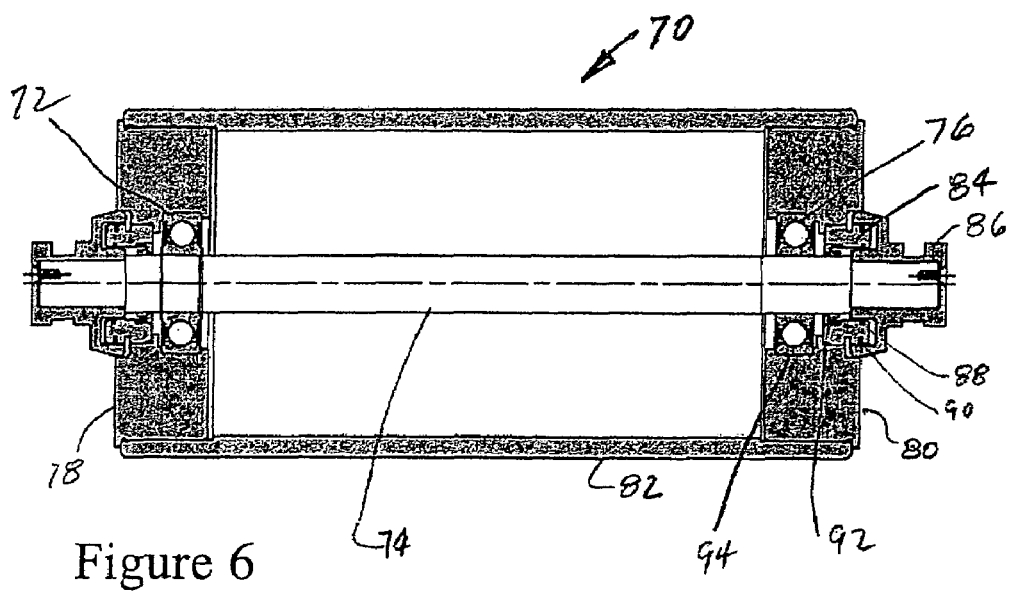
FIG. 6 is a cross-sectional side view of an alternative embodiment of the invention.

Idle roller assembly 70 shown in FIG. 6 illustrates an alternative embodiment. Idle roller 70 has a first bearing assembly 72 mounted inboard of one end of elongate axial shaft 74 and located in a fixed axial position. A second bearing assembly 76 is located inboard of the opposite end of axial shaft 74 and capable of moving axially along the axial shaft through a limited range. The first and second bearing assemblies are each of the ball-bearing design and are provided with an outer race which is securely mounted within first and second annular hub members 78 and 80 as illustrated. The outer periphery of the annular hub member 78 and 80 support a tubular roller 82 in a manner similar to that described with reference to the roller assembly 30 embodiment. The roller 82 may simply be pressed upon the hub members or bonded thereto using a suitable adhesive or solvent.

Idle roller assembly 70 is provided with a third type of seal, a variation on the radial labyrinth referred to as a "Smalley®" seal. A rotary annular seal member 84 is affixed to the annular hub forming a cylindrical axially aligned projection which cooperates with an annular groove in end cap 86. A pair of spring seals 88 and 90 are mounted in grooves on the outer and inner periphery of the rotary seal member which cooperate with corresponding cylindrical surfaces within the groove formed in end cap 86 as illustrated. In addition, an elastomeric lip seal 92 is provided between the shaft 74 and the annular hub or in this case, the rotary seal member affixed to the annular hub, isolating bearing 72 from the outside environment. A similar seal is provided on the opposite end of the idle roller assembly. It should be appreciated that each of the various seal constructions can be used on the idle roller assemblies 30 or 70 shown in FIGS. 2 and 6, respectively, as could other seal configurations which are known to those of ordinary skill in this art area.

Figure 7:
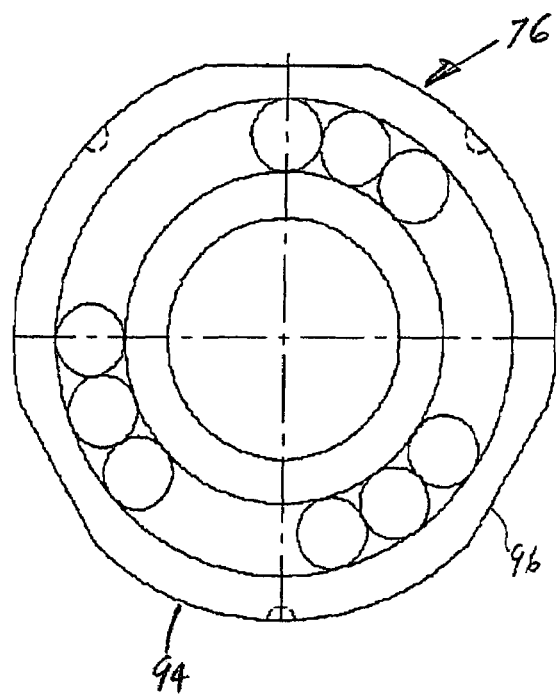
FIG. 7 is a perspective view of an alternative bearing utilized in the present invention.

FIG. 7 and 76 illustrates a bearing utilized in practicing the present invention. The outer bearing race 94 is provided with one or more flats 96 machined therein and spaced about the periphery of the race as illustrated. These machine flats serve to limit relative rotation and axial movement of the outer race relative to the associated annular hub member.

Figure 8:
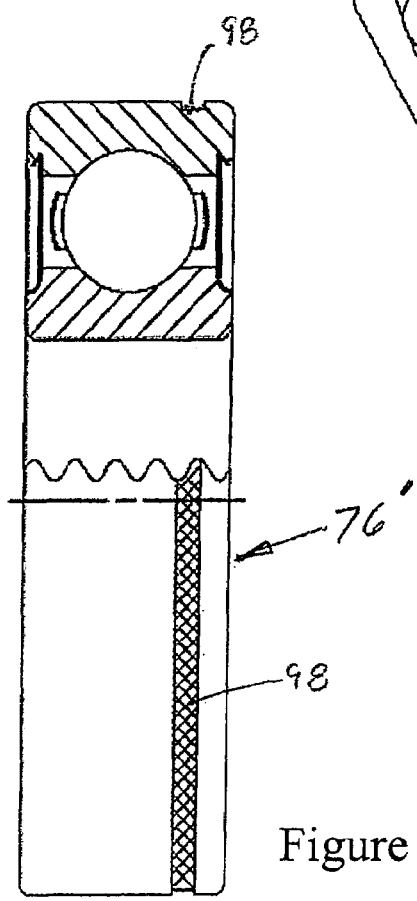
FIG. 8 is a partially cutaway side view of a yet another bearing which can be utilized in the present invention.

FIG. 8 illustrates an alternative mechanism for enhancing the torsion strength of the mechanical joint between the outer race of the bearing and the associated annular hub member. In the bearing 76' illustrated in FIG. 8, the outer bearing race is provided with a knurled region 98 which can either be rolled in or machined in to the outer periphery of the bearing race in order to prevent relative rotation of the bearing race and hub. Of course, various other modifications to the periphery of the outer bearing race can be provided as would be known to one of ordinary skill in this field in order to aid in limiting relative rotation of the outer race and the associated annular hub.

Although various examples of bearings, seals and rollers and combinations thereof are provided herein, the invention contemplates various arrangements and combinations in accordance with the particular conveyor application and cargo. The improved roller assembly of the present invention can utilize the more cost effective polymer materials, can operate under higher temperature conditions due to material selection and mechanical interfaces, and can will be more durable due to the seal configuration which is designed to maintain its function under the thermal expansion of the polymeric materials. In summary, the present invention provides enhanced conveyor roller assembly which can have a relatively low initial cost and improved wear characteristics, which is adaptable to the varying requirements for forming trough conveyor support rollers, thereby reducing total conveyor operating costs and down time for maintenance and repair. Some or all of the above benefits can be achieved in an embodiment of the invention which is adapted to suit a particular conveyor application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An idle roller assembly for supporting a trough conveyor belt and bulk cargo transported thereon, the roller assembly comprising:
    an elongated axial shaft having spaced apart opposed ends adapted to be mounted to a frame;
    a first roller bearing assembly having an inner race mounted about the elongate shaft adjacent a first end thereof, an outer race surrounding the inner race and a plurality of ball roller elements oriented there between and spaced about the shaft axis enabling the outer race to rotate concentrically about the inner race at a substantially fixed axial location;
    a second roller bearing assembly having an inner race mounted about the elongate shaft adjacent a second end thereof, an outer race surrounding the inner race and a plurality of cylindrical roller elements oriented there between and spaced about the shaft axis enabling the outer race to rotate concentrically about the inner race and move axially within a limited range;
    a first annular hub member securely bonded to and extending about the outer periphery of the first roller bearing outer race thereby forming a secure permanent bond there between, the first annular hub member generally concentric with the shaft axis;
    a second annular hub member securely bonded to and extending about the outer periphery of the second roller bearing outer race thereby forming a secure permanent bond there between, the second annular hub member generally concentric with the shaft axis; and
    a cylindrical tubular roller mounted to and spanning between the outer periphery of the first and second annular hub members wherein the roller and associated first and second annular hub members are free to rotate relative to the shaft;
    when in normal use, the cylindrical tubular roller can vary in length relative to the axial shaft due to thermal expansion, wherein the second roller bearing inner and outer race are able to move axially, a sufficient distance to accommodate relative movement between the tubular roller and the axial shaft due to thermal expansion.

2. The roller assembly of claim 1 further comprising a first and second seal located outboard of the first and second roller bearing assemblies, each of the seals having a stationary portion affixed to the shaft adjacent the end and a rotary portion affixed to the adjacent annular hub member.

3. The roller assembly of claim 2 wherein the seal assemblies include a series of axially spaced apart labyrinth rings.

4. The roller assembly of claim 2 wherein the seal assemblies include a series of radially spaced apart plurality of concentric labyrinth rings.

5. The roller assembly of claim 2 wherein the seal assemblies include a series of axially spaced apart plurality of concentric labyrinth rings.

6. The roller assembly of claim 1 wherein one of the first and second roller bearing assemblies has an inner race sized to slip fit about the shaft providing limited axial movement there between to accommodate thermal expansion of the roller during use.

7. The roller assembly of claim 1 wherein one of the first and second roller bearing assemblies has an inner race sized to slip fit about the shaft providing limited axial movement there between to accommodate thermal expansion of the roller during use, wherein the roller elements are ball shaped.

8. The roller assembly of claim 1 wherein the first and second annular hub members are formed of a unitary plastic part which respectively entraps the first and second roller bearing outer races to prevent relative axial, radial or rotary movement therebetween.

9. The roller assembly of claim 8 wherein the first and second annular hub members respectively bonding to the first and second roller bearing outer races.

10. The roller assembly of claim 8 wherein the outer periphery of the first and second roller bearing outer race is provided with a non-cylindrical portion in order to mechanically lock the outer race to the annular hub member extending thereabout.

11. The roller assembly of claim 1 wherein the cylindrical tubular roller is comprised of a polymer.

12. An idle roller assembly for supporting a trough conveyor belt and bulk cargo transported thereon, the roller assembly comprising:
   an elongated axial shaft having spaced apart opposed ends adapted to be mounted to a frame;
   a first roller bearing assembly having an inner race mounted about the elongate shaft at a fixed position adjacent a first end thereof, an outer race surrounding the inner race and a plurality of roller elements oriented there between and spaced about the shaft axis enabling the outer race to rotate concentrically about the inner race;
   a second roller bearing assembly having an inner race mounted about the elongate shaft adjacent a second end thereof, capable of moving axially through a limited range, an outer race surrounding the inner race and a plurality of roller elements oriented there between and spaced about the shaft axis enabling the outer race to rotate concentrically about the inner race;
   a first annular hub member mounted about the outer periphery of the first roller bearing outer race thereby forming a secure attachment there between, the first annular hub member generally concentric with the shaft axis;
   a second annular hub member mounted about the outer periphery of the second roller bearing outer race thereby forming a secure attachment there between, the second annular hub member generally concentric with the shaft axis; and
   a cylindrical tubular roller mounted to and spanning between the outer periphery of the first and second annular hub members wherein the roller and associated first and second annular hub members are free to rotate relative to the shaft; and
   a first and second seal located outboard of the first and second roller bearing assemblies, each of the seals having a stationary portion fixed relative to the shaft adjacent the end and a rotary portion affixed to the adjacent annular hub member;
   wherein the tubular cylindrical roller is formed of a material having a different coefficient thermal expansion than that of the elongate axial shaft so that there is a relative change in length in the cylindrical tubular roller when the idle roller assembly heats up during use, the range of movement of the second roller bearing inner race relative to the axial shaft makes sufficient to accommodate relative changes in length of the tubular roller axial shaft during the normal range of temperatures experienced by tubular roller.

13. The roller assembly of claim 12 wherein the annular hubs and the tubular roller are permanently bonded together.

14. The roller assembly of claim 12 wherein at least one of the first and second roller bearing assemblies is a ball-type roller.

15. The roller assembly of claim 12 wherein the seal assemblies include a series plurality of concentric labyrinth rings.

16. The roller assembly of claim 12 wherein at least one of the seal assemblies include a series of axially spaced apart spring seals.

* * * * *